United States Patent [19]
Jones

[11] Patent Number: 5,218,272
[45] Date of Patent: Jun. 8, 1993

[54] SOLID STATE ELECTRONIC BALLAST SYSTEM FOR FLOUROSCENT LAMPS

[75] Inventor: William H. Jones, Villa Park, Ill.

[73] Assignee: Appliance Control Technology, Inc., Addison, Ill.

[21] Appl. No.: 814,509

[22] Filed: Dec. 30, 1991

[51] Int. Cl.⁵ .................. H05B 41/29; H05B 41/36
[52] U.S. Cl. ........................... 315/247; 315/209 R; 315/224; 315/307; 315/DIG. 5
[58] Field of Search ................. 315/209 R, 224, 307, 315/DIG. 4, DIG. 5, 247, 283, 284

[56] References Cited
U.S. PATENT DOCUMENTS 4,894,587  1/1990  Jungreis et al. .......... 315/DIG. 5 X
5,049,790  9/1991  Herfurth et al. ............... 315/224 X Primary Examiner—David Mis
Attorney, Agent, or Firm—Robert J. Black

[57] ABSTRACT

A high power factor ballast circuit for use with fluorescent lamps consisting of a power factor correcting inductor periodically saturated to store pulses of direct current energy and periodically discharge same at a regular periodic rate to power the fluorescent lamp. A bistable flip-flop circuit and an associated solid state switching device combine to periodically control the saturation and discharge of the inductor.

14 Claims, 1 Drawing Sheet

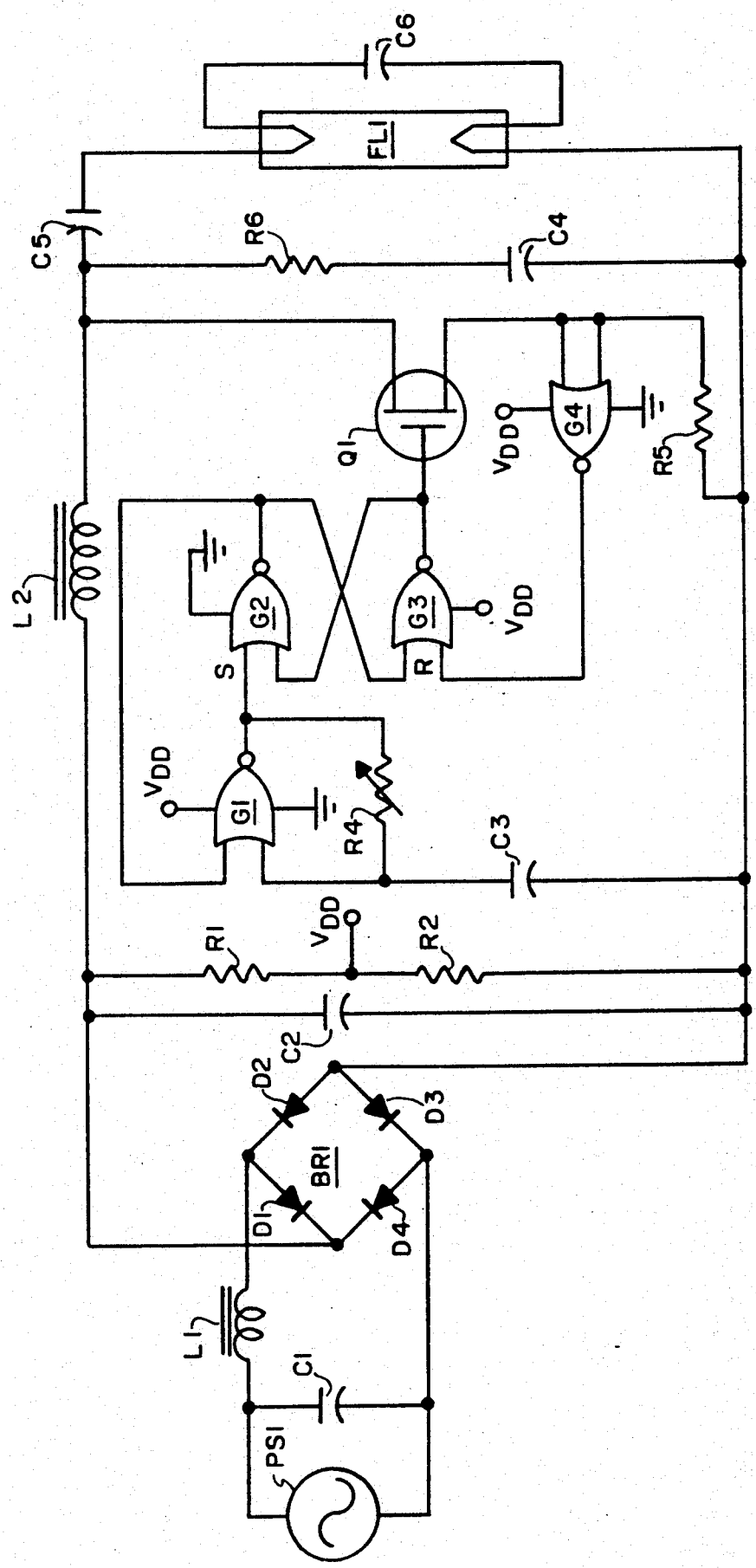

SOLID STATE ELECTRONIC BALLAST SYSTEM FOR FLOUROSCENT LAMPS

BACKGROUND OF THE INVENTION

1. Field of the Invention

The present invention relates to fluorescent lighting systems and more particularly to electronic ballast circuitry for use with fluorescent lamps.

2. Background Art

A search of the background art directed to the subject matter of the present invention conducted in the U.S. Patent and Trademark Office disclosed the following U.S. Pat. Nos. 3,732,460; 3,890,537; 4,168,453; 4,251,752; 4,441,053; 4,523,131; 4,677,345; 4,694,224; 5,030,887.

None of the above patents disclose, teach or claim the improved simplified solid state ballast circuitry taught by the present invention.

SUMMARY OF THE INVENTION

The present invention consists of an electronic ballast circuit for use with fluorescent lamps greatly simplified over those previously employed for similar purposes. The circuitry employed incorporates the utilization of a power factor correcting inductor to serve as the source of high voltage pulses to illuminate the lamp. By utilizing such means, tuned circuitry, special toroid assemblies and the like are eliminated. The present circuitry employs the energy stored in a power factor saturable inductor on each cycle to provide the necessary energy to light the fluorescent lamp. A simple control circuit is employed to control the on and off time of a MOSFET transistor. When the MOSFET transistor is turned on, the stored energy becomes a voltage spike to appear on the line. By means of capacitors, this voltage spike is then directed to the fluorescent lamp. An integrated circuit consisting of four NOR gates is employed to create the necessary control logic for the electronic ballast. One gate is employed as a free running, starting or initiating oscillator. Two gates combined serve as an R/S flip-flop, while the last gate is used to sense current through the MOSFET transistor and to turn off the flip-flop. The cycle created is then repeated.

In operation, as current builds up in the saturable inductor and reaches the desired value, the voltage drop across a sensing resistor is sufficient to shut off the MOSFET transistor. At that time, the energy stored in the magnetic field of the saturable inductor appears as a high voltage, which by means of series and parallel capacitors in the system directs the stored voltage across the fluorescent lamp. The current included in the present circuit design is in phase with line voltage so that the result provides an electronic ballast having a high power factor.

BRIEF DESCRIPTION OF THE DRAWINGS

FIG. 1 is a schematic circuit diagram of a simplified electronic ballast for use with fluorescent lamps in accordance with the present invention.

DESCRIPTION OF THE PREFERRED EMBODIMENT

Referring now to FIG. 1, the circuitry of the present invention is shown. The present invention ballast circuitry is shown connected between a power source PS1, which for the purpose of the present invention shall be considered as a 120 volt, 60 hertz source. The ballast is then connected between that power source to a fluorescent lamp FL1.

Bridge rectifier BR1, consisting of diodes D1, D2, D3, and D4, has its input terminals connected to the power source PS1. Included between bridge rectifier BR1 and the power source PS1 is a transient filter consisting of capacitor C1 and choke L1. This filter acts merely to prevent transient RF energy from being fed back into the power source. Capacitors C2 and C5 act to direct voltage developed within saturable conductor L2 to fluorescent lamp FL1.

Control of the saturable inductor as a storage device is achieved by means of MOSFET transistor Q1 and the associated logic circuitry which consists of an R/S flip-flop consisting of gates G2 and G3, the set input of gate G2 being driven by gate G1 which is wired as an oscillator providing periodic drive pulses to gate G2. Associated with the free running start oscillator consisting of gate G1 is variable resistance R4 which is utilized to determine the output rate of gate G1.

In series with MOSFET transistor Q1 across the load consisting of lamp FL1 is a current sensor in the form of resistor R5. Voltage drops across the sense resistor are detected by means of current sensing detector gate G4 to reset the flip-flop, consisting of gates G2 and G3, by applying a signal to input R of gate G3 in turn causing turn off of transistor Q1. Also across the output of the power supply and in parallel with the fluorescent lamp FL1 is a resistor and capacitor combination consisting of resistor R6 and capacitor C4 which act as a transient protection circuit. Capacitor C6 in series with the filaments of fluorescent lamp FL1 aids in the starting operation of the lamp by preheating the filaments.

As indicated, the NOR gate IC, consisting of gates G1, G2, G3 and G4 may be implemented by many off-the-shelf NOR gate integrated circuits including the Archer No. 4,001, which is a CMOS building block chip. Gate G1 operates as a free running start oscillator with two gates, G2 and G3, serving as an R/S flip-flop, the last gate being used to sense current flowing through the MOSFET transistor Q1 and in turn, utilized to turn off the flip-flop consisting of gates G2 and G3.

In operation, as current builds up in saturable inductor L2 and reaches a desired value, the voltage will then drop across the sensing resistor R5. This drop is sufficient to shut off the MOSFET transistor Q1. At that time, the energy stored in the magnetic field of the saturable inductor L2 appears as a high voltage on the line. By means of capacitors C2 and C5, this high voltage is impressed across fluorescent lamp FL1. As indicated, capacitor C6 would aid in starting the lamp by preheating the filaments. The oscillator NOR gate G1 will then turn on MOSFET transistor Q1 by resetting flip-flop circuitry at the input to gate G2. At this time the cycle will begin all over again and repeat on a continual basis providing adequate power to operate fluorescent lamp FL1.

It is of particular significance to note that the circuit design is such that current within the present invention is in phase with line voltage. This then means that the electronic ballast of the present invention has a high power factor providing much better efficiency than in prior art ballasts.

While but a single embodiment of the present invention has been shown it will be obvious to those skilled in the art that numerous modifications may be made without departing from the spirit of the present invention which shall be limited only by the scope of the claims appended hereto.

What is claimed is:

1. A high power factor ballast circuit connected between a source of alternating current and a fluorescent lamp, said ballast circuit comprising:
   a rectifier circuit connected to said power source operated to produce direct current from said alternating current source;
   a first circuit connection including a power factor correcting saturable inductor and a capacitor connected in series between said rectifier circuit and said fluorescent lamp, said saturable inductor storing energy from said rectifier circuit until saturated;
   a second circuit connection directly between said fluorescent lamp and said rectifier circuit;
   a second capacitor connected between said first and second circuit connections;
   a first solid state switching device connected to a junction between said saturable inductor and said first capacitor and said direct connection, in parallel with said fluorescent lamp;
   a bistable flip-flop circuit including a first output connected to said solid state switching device;
   a free running oscillator connected to a first input of said bistable flip-flop circuit;
   said bistable flip-flop circuit normally operated in response to said free running oscillator to periodically operate said solid state switching device;
   current sensing means in series with said solid state switching device connected to a second input of said bistable flip-flop circuit, operated in response to an increase in current flowing through said solid state switching device, indicative of saturation of said saturable inductor, to change the state of said bistable flip-flop circuit, said solid state switching device rendered inoperable in response to said bistable flip-flop circuit state change and said energy stored in said saturable inductor discharged and directed by said first and second capacitors to said fluorescent lamp, whereby said fluorescent lamp is operated with periodic discharges from said saturable inductor occurring at a rate capable of maintaining said fluorescent lamp operated.

2. A ballast circuit as claimed in claim 1 wherein: said rectifier circuit is a bridge rectifier.

3. A ballast circuit as claimed in claim 2 wherein: said bridge rectifier includes a plurality of diodes.

4. A ballast circuit as claimed in claim 1 wherein: there is further included a transient filter connected between said source of alternating current and said rectifier circuit.

5. A ballast circuit as claimed in claim 4 wherein: said transient filter comprises an inductor connected in series between said source of alternating current and said rectifier circuit and a capacitor connected in parallel across said source of alternating current.

6. A ballast circuit as claimed in claim 1 wherein: said free running oscillator includes a single NOR gate and a variable resistance connected between an output and an input of said gate, said variable resistance operated to control the frequency of operation of said oscillator.

7. A ballast circuit as claimed in claim 1 wherein: said solid state switching device is a MOSFET transistor.

8. A ballast circuit as claimed in claim 1 wherein: there is further included a transient protection circuit comprising a resistance and a capacitor in series connected in parallel across said fluorescent lamp.

9. A ballast circuit as claimed in claim 1 wherein: there is further included preheating means connected in parallel with said fluorescent lamp.

10. A ballast circuit as claimed in claim 9 wherein: said preheating circuit comprises a capacitor.

11. A ballast circuit as claimed in claim 1 wherein: there is further included power supply means for said sensing means, said oscillator and said bistable flip-flop connected between said first and second circuit connections.

12. A ballast circuit as claimed in claim 11 wherein: said power supply consists of a voltage divider.

13. A ballast circuit as claimed in claim 1 wherein: said current sensing means includes a resistor in series with said solid state switching device and gating means connected between said current sensing resistor and said bistable flip-flop second input.

14. A ballast circuit as claimed in claim 13 wherein: said bistable flip-flop, said oscillator and said current sensing gating means are all included in a quad NOR gate integrated circuit.

* * * * *